(12) United States Patent
Gautam et al.

(10) Patent No.: US 10,597,488 B2
(45) Date of Patent: Mar. 24, 2020

(54) PROCESS FOR PREPARING POLY(ESTER-CARBONATE)S AND POLY(ESTER-CARBONATE)S PREPARED THEREBY

(71) Applicant: SABIC GLOBAL TECHNOLOGIES B.V., Bergen op Zoom (NL)

(72) Inventors: Pankaj Singh Gautam, Evansville, IN (US); Rahul Patil, Evansville, IN (US); Jorge Jimenez, Lake Jackson, TX (US); Joshua D. Taylor, Missouri City, TX (US); James Alan Mahood, Evansville, IN (US); James Franklin Hoover, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 47 days.

(21) Appl. No.: 16/062,909

(22) PCT Filed: Nov. 16, 2016

(86) PCT No.: PCT/US2016/062255
§ 371 (c)(1),
(2) Date: Jun. 15, 2018

(87) PCT Pub. No.: WO2017/105736
PCT Pub. Date: Jun. 22, 2017

(65) Prior Publication Data
US 2018/0362706 A1 Dec. 20, 2018

Related U.S. Application Data

(60) Provisional application No. 62/269,337, filed on Dec. 18, 2015.

(51) Int. Cl.
| | | |
|---|---|---|
| *C08G 63/64* | (2006.01) | |
| *C08G 63/81* | (2006.01) | |
| *C08G 64/20* | (2006.01) | |
| *C08K 5/13* | (2006.01) | |
| *C08G 64/24* | (2006.01) | |
| *B01J 19/00* | (2006.01) | |
| *B01J 19/18* | (2006.01) | |

(52) U.S. Cl.
CPC .......... *C08G 63/64* (2013.01); *C08G 63/81* (2013.01); *C08G 64/205* (2013.01); *C08G 64/24* (2013.01); *C08K 5/13* (2013.01); *B01J 19/0066* (2013.01); *B01J 19/1812* (2013.01); *C08G 2105/00* (2013.01)

(58) Field of Classification Search
USPC .................................................. 528/196, 198
See application file for complete search history.

(56) References Cited

U.S. PATENT DOCUMENTS

| | | |
|---|---|---|
| 4,983,706 A | 1/1991 | Fontana et al. |
| 5,015,720 A | 5/1991 | Boden et al. |
| 5,025,081 A | 6/1991 | Fontana et al. |
| 5,510,448 A | 4/1996 | Fontane et al. |
| 5,959,064 A | 9/1999 | Krabbenhoft |
| 6,753,404 B2 | 6/2004 | Suh et al. |
| 7,709,592 B2 | 5/2010 | Mahood |
| 2014/0124709 A1 | 5/2014 | Zheng et al. |
| 2014/0295363 A1 | 10/2014 | Sun et al. |

FOREIGN PATENT DOCUMENTS

| | | |
|---|---|---|
| CA | 2025300 A1 | 6/1991 |
| WO | 0149772 A1 | 7/2001 |
| WO | 2013175448 A1 | 11/2013 |
| WO | 2014072923 A1 | 5/2014 |

OTHER PUBLICATIONS

International Search Report for International Application No. PCT/US2016/062255, International Filing Date Nov. 16, 2016, dated Jan. 30, 2017, 5 pages.
Keohan et al., Synthesis of high molecular weight polyester carbonates via interfacial phosgenation of aromatic dicarboxylic acids and bisphenols; Journal of Polymer Science: Polymer Chemistry Edition; Mar. 1984; 1 page Abstract.
Prevorsek et al., Synthesis of poly(ester carbonate) copolymers; Journal of Polymer Science: Polymer Chemistry Edition; Jan. 1980; 1 page Abstract.
Written Opinion for International Application No. PCT/US2016/062255, International Filing Date Nov. 16, 2016, dated Jan. 30, 2017, 6 pages.

*Primary Examiner* — Terressa Boykin
(74) *Attorney, Agent, or Firm* — Cantor Colburn LLP

(57) ABSTRACT

A method of preparing a poly(ester-carbonate) includes contacting an aqueous solution including a dicarboxylic acid with a first solution including phosgene and a first organic solvent in a tubular reactor to provide a first reaction mixture. A dihydroxy aromatic compound, the corresponding dialkali metal salt of the dihydroxy aromatic compound, or a combination comprising at least one of the foregoing, water, and a second organic solvent are combined to provide a second reaction mixture. The method further includes introducing the first reaction mixture, the second reaction mixture, and a second solution comprising phosgene to a tank reactor, wherein the tank reactor has a first pH of 7 to 10. The pH is optionally raised to 9 to 11 to provide a third reaction mixture including the poly(ester-carbonate). Poly(ester-carbonate)s prepared according to the method described herein are also disclosed.

18 Claims, 1 Drawing Sheet

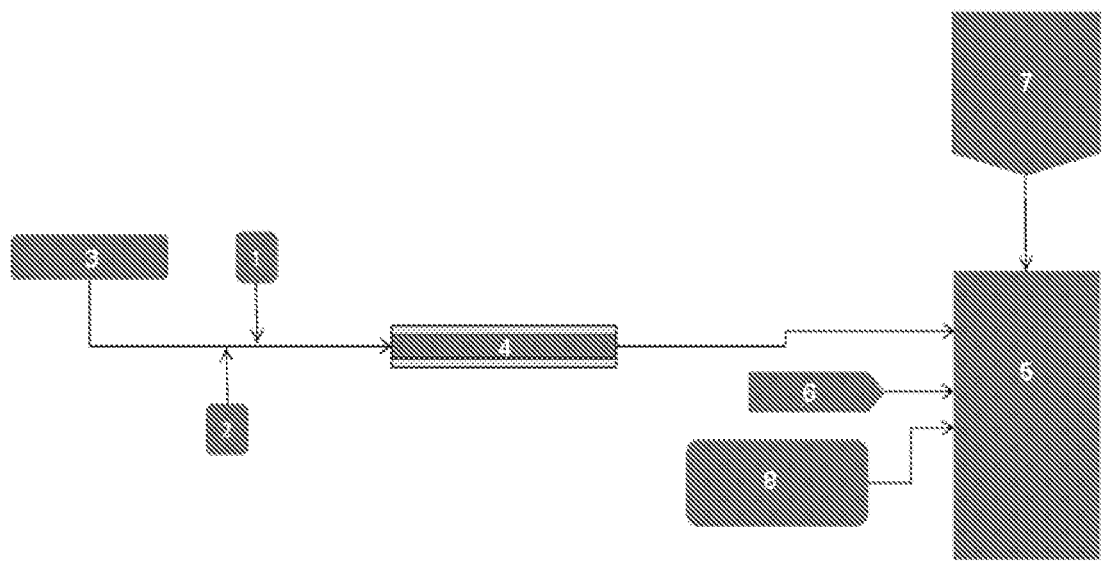

PROCESS FOR PREPARING POLY(ESTER-CARBONATE)S AND POLY(ESTER-CARBONATE)S PREPARED THEREBY

CROSS-REFERENCE TO RELATED APPLICATIONS

This application is a National Stage application of PCT/US2016/062255, filed Nov. 16, 2016, which claims the benefit of U.S. Provisional Application No. 62/269,337, filed Dec. 18, 2015, both of which are incorporated by reference herein in their entirety.

BACKGROUND

Polycarbonates (PC) are synthetic thermoplastic polymers derived from the reaction of dihydroxy compounds and phosgene, or their derivatives. They are essentially linear polyesters of carbonic acid and can be formed interfacially from reaction of dihydroxy compounds with phosgene or via ester interchange by reaction of dihydroxy compounds with a carbonate diester. The desired properties of polycarbonates include clarity or transparency (i.e. 90% light transmission or more), high impact strength and toughness, heat resistance, weather and ozone resistance, good ductility, being combustible but self-extinguishing, good electrical resistance, noncorrosive, and nontoxic. They are useful for forming a wide array of products, such as by molding, extrusion, and thermoforming processes.

In producing a polycarbonate, a homopolycarbonate is generally formed from the polymerization of a dihydroxy compound such as bisphenol A. However, when a dicarboxylic acid is copolymerized with the dihydroxy compound, a poly(ester-carbonate) (also known as a copolyester-carbonate, polycarbonate-ester, or a polyestercarbonate) results. A variety of dicarboxylic acids have been copolymerized with dihydroxy compounds to form various poly(ester-carbonate)s. Such poly(ester-carbonate)s generally have lower glass transition temperatures, improved melt flow rates, and better ductility relative to a bisphenol A homopolycarbonate.

Short chain dicarboxylic acids can be particularly desirable for the production of poly(ester-carbonate)s. However, short chain dicarboxylic acids, such as, adipic acid, can be difficult to incorporate into poly(ester-carbonate)s. Poor incorporation of the dicarboxylic acid can create undesirable quality issues, while incomplete incorporation leaves residual adipic acid in process streams that can adversely affect downstream operations. Short chain dicarboxylic acids have been successfully incorporated via interfacial polymerization when used in an activated form, such as the acid chloride or anhydride form. See, for example, U.S. Pat. No. 5,015,720. However, these activated forms are more expensive than the simple dicarboxylic acid. In addition, they can contain color contaminants that cause the final polymer to be highly colored. This is undesirable for applications in which a transparent or low color polymer composition is sought.

Accordingly, there remains a need for new processes that allow for incorporation of high levels of a dicarboxylic acid into a poly(ester-carbonate) while avoiding the above-described technical limitations of presently known methods.

BRIEF DESCRIPTION

A method of preparing a poly(ester-carbonate) comprises contacting an aqueous solution comprising a dicarboxylic acid with a first solution comprising phosgene and a first organic solvent in a tubular reactor to provide a first reaction mixture comprising the dicarboxylic acid, the corresponding diacid chloride, phosgene, or a combination comprising at least one of the foregoing; combining a dihydroxy aromatic compound, the corresponding dialkali metal salt of the dihydroxy aromatic compound, or a combination comprising at least one of the foregoing, water, and a second organic solvent to provide a second reaction mixture; introducing the first reaction mixture, the second reaction mixture, and a second solution comprising phosgene to a tank reactor, wherein the tank reactor has a first pH of 7 to 9, preferably 8 to 9, more preferably 8 to 8.5, to provide a third reaction mixture comprising the poly(ester-carbonate).

A method of preparing a poly(ester-carbonate) comprises contacting an aqueous solution comprising a dicarboxylic acid with a first solution comprising phosgene and a first organic solvent in a tubular reactor to provide a first reaction mixture comprising the dicarboxylic acid, the corresponding diacid chloride, phosgene, or a combination comprising at least one of the foregoing; combining a dihydroxy aromatic compound, the corresponding dialkali metal salt of the dihydroxy aromatic compound, or a combination comprising at least one of the foregoing, water, and a second organic solvent to provide a second reaction mixture; introducing the first reaction mixture, the second reaction mixture, and a second solution comprising phosgene to a tank reactor, wherein the tank reactor has a first pH of 7 to 9, preferably 8 to 9, more preferably 8 to 8.5; and subsequently raising the pH to 9 to 11, preferably 10 to 11 to provide a third reaction mixture comprising the poly(ester-carbonate).

A poly(ester-carbonate) prepared by the above method and an article formed from the poly(ester-carbonate) are also described.

The above described and other features are exemplified by the following FIGURE and detailed description.

BRIEF DESCRIPTION OF THE DRAWING

The FIGURE is of an exemplary embodiment, and shows a schematic illustration of the process described herein.

DETAILED DESCRIPTION

Disclosed herein is a process for preparing poly(ester-carbonates), in particular high flow ductile poly(ester-carbonate)s. The present inventors have determined poly(ester-carbonate)s can advantageously be prepared using a method comprising a catalyzed interfacial phosgenation process in which phosgene is reacted with a dicarboxylic acid in a tubular reactor to provide the corresponding highly-reactive acid chlorides, allowing for rapid incorporation into the poly(ester-carbonate). Subsequently, the products of the phosgenation process in the tubular reactor can be contacted with a dihydroxy aromatic compound in a conventional tank reactor to complete the polymerization. The present inventors have also determined that using an optimized pH profile in combination with the tubular reactor can provide further advantages, including good incorporation of the dicarboxylic acid into the poly(ester-carbonates). The use of a tubular reactor as described herein can allow for increased production rates for poly(ester-carbonates) without requiring a setup that can accommodate an increased capacity. Use of a tubular reactor further allows use a higher pH for the phosgenation process, in particular a range of 8-8.5, versus 6. Using the methods described herein, poly(ester-carbonate)s having superior melt flow, superior ductility, or both, compared to the corresponding homopolycarbonates can be prepared.

Accordingly, an aspect of the present disclosure is a method of preparing a poly(ester-carbonate). The method can be carried out as a batch process or as a continuous process. Preferably the method is a continuous method. The method comprises contacting an aqueous solution comprising a dicarboxylic acid with a first solution comprising phosgene and a first organic solvent in a tubular reactor. In some embodiments the tubular reactor comprises a tube jacket arranged outside the tubular reactor. The tube jacket can have water at a temperature of 1 to 10° C. flowing through the jacket to maintain a reaction mixture temperature of 20 to 55° C. inside the tubular reactor. In some embodiments, the tubular reactor can be in the form of a shell and tube-type reactor, having 2 or more tubes enclosed within an outer shell. A cooling fluid stream can be positioned on the shell side or the tube side section of the reactor. The dimensions of the reactor (tube and shells) can vary depending on the scale of the process as is known in the art.

The aqueous solution comprises a dicarboxylic acid (which includes a reactive derivative thereof). The dicarboxylic acid can include, for example, a $C_{2-20}$ alkylene dicarboxylic acid, a $C_{6-20}$ cycloalkylene dicarboxylic acid, or a $C_{6-20}$ arylene dicarboxylic acid. In some embodiments, the dicarboxylic acid is a $C_{6-36}$ aliphatic diacid, preferably a linear $C_{6-12}$ aliphatic dicarboxylic acid. Specific dicarboxylic acids include, but are not limited to, n-hexanedioic acid (adipic acid), n-decanedioic acid (sebacic acid), and alpha, omega-$C_{12}$ dicarboxylic acids such as dodecanedioic acid (DDDA), or a combination comprising at least one of the foregoing. In some embodiments, the dicarboxylic acid comprises adipic acid, sebacic acid, dodecanedioic acid, or a combination comprising at least one of the foregoing. In some embodiments, the dicarboxylic acid comprises sebacic acid, dodecanedioic acid, or a combination comprising at least one of the foregoing. In some embodiments, the dicarboxylic acid is sebacic acid.

The dicarboxylic acid can be present in the poly(ester-carbonate) in an amount of 3 to 30 mole percent, or 5 to 20 mole percent, or 5 to 10 mole percent, based on moles of the dihydroxy aromatic compound. The amount of the dicarboxylic acid can vary with respect to its chain length, and its physical properties can vary by the input amount. For example, if the input amount is less than 3 mole percent, high melt flow of poly(ester-carbonate) cannot be obtained, and if the input amount is greater than 30 mole percent, standard mechanical properties of poly(ester-carbonate) cannot be obtained. Thus, the input amount of the dicarboxylic acid is generally preferred to be 5 to 20 mole percent.

In some embodiments, the aqueous solution comprises an alkaline aqueous solution. The aqueous alkaline solution can include 20 to 40 weight percent (wt %) of an alkali metal hydroxide, for example sodium hydroxide, potassium hydroxide, lithium hydroxide, or a combination comprising at least one of the foregoing. In some embodiments, the aqueous alkaline solution preferably comprises sodium hydroxide.

In some embodiments, the aqueous solution further comprises a catalyst. When present, the catalyst is preferably a tertiary amine Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. In some embodiments, the catalyst is triethylamine.

The above-described aqueous solution is contacted with a first solution comprising phosgene and a first organic solvent. The first organic solvent can be a $C_{1-6}$ chlorinated hydrocarbon, and is preferably immiscible with water. Exemplary organic solvents that are immiscible with water can include methylene chloride, chloroform, dichloroethane, monochlorobenzene, toluene, dichlorobenzene, carbon tetrachloride, trichloroethane, trichloroethylene, tetrachloroethylene, and the like, or a combination comprising at least one of the foregoing. In some embodiments, the organic solvent is methylene chloride.

As mentioned above, the aqueous solution and the first solution are advantageously contacted in a tubular reactor to provide a first reaction mixture comprising the dicarboxylic acid, the corresponding diacid chloride, phosgene, or a combination comprising at least one of the foregoing. In some embodiments, the contacting comprises introducing the first solution comprising phosgene and a first organic solvent to the tubular reactor at a linear fluid velocity of 3 to 45 meters per minute. In some embodiments, the contacting comprises introducing the aqueous solution to the tubular reactor at a rate that results in a combined linear fluid velocity of the all fluids in the tubular reactor of 5 to 65 meters per minute, preferably 8 to 60 meters per minute, more preferably 10 to 53 meters per minute. In some embodiments, the first reaction mixture that results from the contacting has a residence time in the tubular reactor of 15 to 50 seconds, or 20 to 45 seconds. In some embodiments, an excess of phosgene can be employed to ensure a high reaction conversion, for example 5 to 60% excess phosgene (based on the moles of dicarboxylic acid) can be contacted with the first reaction mixture in the tubular reactor. Within this range, in some embodiments at least 25% excess phosgene can be used, or 30 to 50% excess phosgene, or 40% excess phosgene, based on the moles of dicarboxylic acid.

The method also comprises combining a dihydroxy compound, specifically a dihydroxy aromatic compound, the corresponding dialkali metal salt of the dihydroxy aromatic compound, or a combination comprising at least one of the foregoing, water and a second organic solvent to provide a second reaction mixture. The second organic solvent is preferably immiscible with water, and can be as described above in reference to the first organic solvent. In some embodiments, the second organic solvent is the same as the first organic solvent. In some embodiments, the second organic solvent is a $C_{1-6}$ chlorinated hydrocarbon, preferably dichloromethane.

The dihydroxy aromatic compound can be of the formula

$$HO-Z-OH \quad (1)$$

wherein Z is an aromatic $C_{6-24}$ monocyclic or polycyclic moiety optionally substituted with 1 to 6 $C_{1-12}$ alkyl groups, $C_{1-12}$ alkoxy groups, 1 to 8 halogen atoms, or a combination comprising at least one of the foregoing. Exemplary dihydroxy aromatic compounds are illustrated by formula (2) and (3).

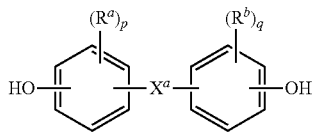

(3)

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. In formula (3), $R^a$ and $R^h$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^h$ are each a $C_{1-3}$ alkyl group, specifically methyl, which can be disposed ortho, meta, or para to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein W is a divalent $C_{1-12}$ hydrocarbon group. In some embodiments, Z is a divalent group of the formula

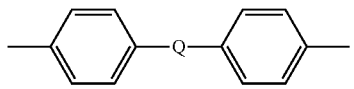

(4)

wherein Q is —O—, —S—, —C(O)—, —SO$_2$—, —SO—, or —C$_y$H$_{2y}$- wherein y is an integer from 1 to 5 or a halogenated derivative thereof, preferably wherein Z is 2,2-(4-phenylene)isopropylidene. Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA", in which Q is isopropylidene in the above formula), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, 1,1-bis(4-hydroxy-3-methylphenyl)-3,3,5-trimethylcyclohexane (isophorone bisphenol) and 1,1-bis(4-hydroxy-phenyl)-3,3,5-trimethylcyclohexane (isophorone bisphenol). In some embodiments, the dihydroxy aromatic compound is bisphenol A.

In some embodiments, the corresponding dialkali metal salt of the dihydroxy aromatic compound can be of the formula

MO—Z—OM (5)

wherein Z is as described above, and each M is independently an alkali metal for example sodium, potassium, lithium, and the like, preferably sodium.

In some embodiments, the second reaction mixture further comprises a phase transfer catalyst. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4$NX, $(CH_3(CH_2)_3)_4$PX, $(CH_3(CH_2)_5)_4$NX, $(CH_3(CH_2)_6)_4$NX, $(CH_3(CH_2)_4)_4$NX, $CH_3(CH_3(CH_2)_3)_3$NX, and $CH_3(CH_3(CH_2)_2)_3$NX, wherein X is Cl⁻, Br⁻, a $C_{1-8}$ alkoxy or a $C_{6-18}$ aryloxy. An effective amount of a phase transfer catalyst can be 0.1 to 10 weight percent (wt %), or 0.5 to 2 wt %, each based on the weight of dihydroxy aromatic compound in the second reaction mixture. In some embodiments, the phase transfer catalyst comprises a tetra($C_{1-6}$) alkyl ammonium halide or (hexa($C_{1-6}$))$C_{1-6}$alkylene diammonium dihalide, preferably methyltributyl ammonium halide, hexabutylbutylene diammmonium dihalide, or a combination comprising at least one of the foregoing.

In some embodiments, the second reaction mixture can optionally further comprise a chelant. Any suitable chelating agent can be used, for example, salts of ethylenediamine tetraacetic acid, sodium tetraphosphate, sodium gluconate, sodium citrate, di(hydroxyethyl)glycine, (hydroxyethyl)ethylenediamine triacetic acid, diethylenetriamine pentaacetic acid, gluconic acid, tartaric acid, citric acid, saccharic acid, phosphate salts such as, for example, sodium pyrophosphate, sodium tripolyphosphate, sodium tetrapolyphosphate, sodium phosphate glasses generally, for example, acetyl acetone, and the like, or a combination comprising at least one of the foregoing. In some embodiments, the chelant comprises sodium gluconate.

The method further comprises introducing the first reaction mixture, the second reaction mixture, and a second solution comprising phosgene to a tank reactor. The tank reactor can be a stirred tank reactor. During the introducing of the first reaction mixture, the second reaction mixture, and the second solution, the tank reactor has a first pH. The first pH is maintained at a first pH of 7 to 9, preferably 8 to 9, more preferably 8 to 8.5. The first pH can be controlled by, for example, adding an aqueous alkaline solution, for example an aqueous alkaline solution comprising an alkali metal hydroxide (e.g., sodium hydroxide). In some embodiments, it can be necessary to continuously add the aqueous alkaline solution to maintain the first pH for a desired amount of time. In some embodiments, the first pH can be maintained for a period of time of 15 to 40 minutes. In some embodiments, the second solution comprising phosgene is introduced to the tank reactor at a rate effective to provide, averaged over one hour, a weight ratio of the phosgene to the aromatic dihydroxy compound of 0.3:1 to 3.1:1, preferably 0.9:1 to 2.2:1, more preferably 1.25:1 to 1.9:1. Subsequent to the introduction of the first reaction mixture, the second reaction mixture, and the second solution comprising phosgene to the tank reactor, a third reaction mixture comprising the poly(ester-carbonate) can be provided.

In some embodiments, it can be advantageous to raise the pH of the tank reactor following the introduction of the first reaction mixture, the second reaction mixture, and the second solution comprising phosgene to the tank reactor. Thus the method can further include raising the pH to a second pH of 9 to 11, preferably 10 to 11 to provide a third reaction mixture comprising the poly(ester-carbonate). Raising the pH of the second reaction mixture can occur subsequent to the above-described first period of time. Raising the pH can be by the further addition of aqueous alkaline solution. In some embodiments, raising the pH can be a stepwise transition. In some embodiments, raising the pH can be a gradient transition. The pH of the third reaction mixture is maintained at 9 to 11 for a desired period of time, for example until the reaction is substantially complete or complete.

A certain amount of anhydride linkages can be generated by the phosgenation of the dicarboxylic acid. These anhydride linkages are generally stable at low pH but react with the dihydroxy compound at the higher pH. If the pH is raised too soon, poor incorporation of the dicarboxylic acid results. If the pH is raised too late, anhydride linkages will remain in the resulting poly(ester-carbonate) and it will not be thermally stable. If the pH is raised while some dihydroxy compound remains to react with the anhydride compounds, then additional phosgene needs to be added to consume any remaining dihydroxy compound and complete the reaction. The period of time at which the pH is maintained at the first pH can be 5 to 60 minutes, or 15 to 40 minutes prior to raising the pH to provide the third reaction mixture.

Following completion of the reaction, the poly(estercarbonate) can be separated from the reaction mixture using methods that are generally known in the art. The third reaction mixture preferably comprises less than or equal to 500 parts per million (ppm), preferably less than or equal to 125 ppm, or less than or equal to 100 ppm, or less than or equal to 75 ppm, or less than or equal to 50 ppm, or less than or equal to 25 ppm, or less than or equal to 10 ppm of residual dicarboxylic acid. In some embodiments, at least 90%, preferably at least 94%, more preferably at least 96%, even more preferably at least 98% of the total amount of dicarboxylic acid is incorporated into the poly(ester-carbonate).

In some embodiments, the method further comprises adding an end-capping agent to the tank reactor. An end-capping agent (also referred to as a chain stopper agent or chain terminating agent) can be included during polymerization to provide end groups. The end-capping agent (and thus end groups) is selected based on the desired properties of the poly(ester-carbonate)s. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. The end-capping agent, when used, can be added at any suitable stage during the process. For example, the end-capping agent can be added to the first, second, or third reaction mixtures.

In an embodiment, the method can be as depicted in the FIGURE. As shown in the FIGURE, an aqueous solution (1) is contacted with a first solution comprising phosgene (2) and an organic solvent (3) and introduced to a tubular reactor (4) to provide the first reaction mixture comprising the dicarboxylic acid, the corresponding diacid chloride, phosgene, or a combination comprising at least one of the foregoing. The first reaction mixture is transferred to a second reactor (5), which is a tank reactor. Also added to the second reactor (5) is a second solution comprising phosgene (6), a second reaction mixture (7) comprising a dihydroxy aromatic compound, the corresponding dialkali metal salt of the dihydroxy aromatic compound, or a combination comprising at least one of the foregoing, water, and a second organic solvent, and an aqueous alkaline solution (8). The tank reactor (5) has a first pH of 7 to 9, preferably 8 to 9, more preferably 8 to 8.5, to provide a third reaction mixture comprising the poly(ester-carbonate). In some embodiments, the pH of the tank reactor (5) can be subsequently raised to 9 to 11, preferably 10 to 11 to provide the third reaction mixture comprising the poly(ester-carbonate).

Another aspect of the present disclosure is a poly(estercarbonate) prepared by the above-described method. Poly (ester-carbonates) comprise repeating structural carbonate units of the formula (6)

(6)

wherein at least 60 percent of the total number of $R^1$ groups are aromatic, or each $R^1$ contains at least one $C_{6-30}$ aromatic group. Specifically, each $R^1$ can be derived from a dihydroxy compound of formula (1), (2), (3), or (4) as described above.

Poly(ester-carbonate)s further contain, in addition to recurring carbonate chain units of formula (6), repeating ester units of formula (7)

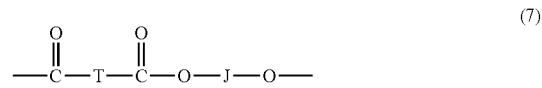

(7)

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Poly(ester-carbonate)s containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_{12}$ dicarboxylic acids such as dodecanedioic acid (DDDA).

Specific ester units include ester units derived from sebacic acid and bisphenol A. The molar ratio of ester units to carbonate units in the poly(ester-carbonate)s can vary broadly, for example 1:99 to 30:70, specifically, 2:98 to 25:75, more specifically, 3:97 to 20:80, or from 5:95 to 15:85.

A specific example of a poly(ester-carbonate) is a poly (aliphatic ester-carbonate) derived from a linear $C_{6-20}$ aliphatic dicarboxylic acid, specifically a linear $C_6$-$C_{12}$ aliphatic dicarboxylic acid. Specific dicarboxylic acids include n-hexanedioic acid (adipic acid), n-decanedioic acid (sebacic acid), and alpha, omega-$C_{12}$ dicarboxylic acids such as dodecanedioic acid (DDDA). A specific poly(aliphatic ester)-polycarbonate is of formula (8):

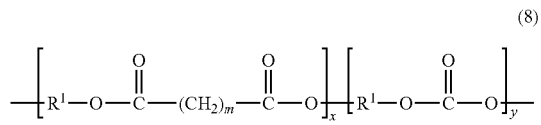

(8)

wherein each $R^1$ can be the same or different, and is as described in formula (6), m is 4 to 18, specifically 4 to 10, and the average molar ratio of ester units to carbonate units x:y is 99:1 to 1:99, including 13:87 to 2:98, or 9:91 to 2:98, or 8:92 to 2:98. In a specific embodiment, the poly(aliphatic ester)-polycarbonate copolymer comprises bisphenol A-sebacate ester units and bisphenol A carbonate units, having, for example an average molar ratio of x:y of 2:98 to 8:92, for example 6:94.

The poly(ester-carbonate) can have a weight average molecular weight of 12,000 to 60,000 Dalton (Da), or 15,000 to 45,000 Da, or 18,000 to 40,000 Da, as measured by gel permeation chromatography (GPC) based on BPA homopolycarbonate standards calibrated with polystyrene, and eluting with a solvent comprising dichloromethane. In some embodiments, the poly(ester-carbonate)s exhibit a molecular weight drop of less than 10%, or less than 5%, or less than 2%. "Molecular weight drop" and a suitable method for its determination are further described in the working examples below. In some embodiments, the poly (ester-carbonate) is substantially free of dicarboxylic acid-dicarboxylic acid (i.e., anhydride) linkages. "Substantially free" means that the poly(ester-carbonate) comprises less than 1 mole percent of dicarboxylic acid-dicarboxylic acid linkages, preferably less than 0.5 mole percent of dicarboxylic acid-dicarboxylic acid linkages, more preferably less than 0.1 mole percent of dicarboxylic acid-dicarboxylic acid linkages. In some embodiments, the poly(ester-carbonate) is devoid of any dicarboxylic acid-dicarboxylic acid linkages (i.e., no dicarboxylic acid-dicarboxylic acid linkages are present in the poly(ester-carbonate)). The presence of dicarboxylic acid-dicarboxylic acid linkages can be quantified, for example, using nuclear magnetic resonance (NMR) spectroscopy. In some embodiments, the poly(ester-carbonate) can include the dicarboxylic acid in an amount of 1 to 10 mole percent, or 5 to 10 mole percent, based on the total moles of the poly(ester-carbonate).

In some embodiments, the poly(ester-carbonate)s can be high flow, ductile poly(ester-carbonate)s. Accordingly, the poly(ester-carbonate)s can have one or more of the following properties.

In some embodiments, the poly(ester-carbonate)s can have a glass transition temperature (Tg) of 100 to 150° C.

In some embodiments, the poly(ester-carbonate)s can have a melt volume flow rate (MVR) of 0.5 to 100 cubic centimeters per 10 minutes (cc/10 min), or 1 to 75 cc/10 min, or 2 to 50 cc/10 min, or 10 to 40 cc/10 min., determined at 300° C. under a load of 1.2 kilograms according to ASTM D1238.

In some embodiments, the poly(ester-carbonate)s can have a ductility of 10 to 100%, or 40 to 100%, measured in accordance with ASTM D256.

If desired, the poly(ester-carbonate)s can be combined, e.g., blended, with other polymers to form a composition. In some embodiments, suitable modifying polymers are those which form blends with the poly(ester-carbonate)s including but not limited to polycarbonate homopolymers, other copolycarbonates (such as poly(carbonate-siloxanes)); polyesters, polyamides, polystyrenes, polyurethanes, polyarylates, liquid crystalline polymers, vinyl polymers, and the like, or a combination comprising at least one of the foregoing. The poly(ester-carbonate) compositions can also contain one or more additives with the proviso that the one or more additives do not significantly adversely affect one or more desired properties of the poly(ester-carbonate). Suitable additives can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The poly(ester-carbonate) compositions can be manufactured by various methods known in the art. For example, powdered poly(ester-carbonate), and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

The poly(ester-carbonate) or composition formed therefrom can be used to form a number of articles for a variety of uses. Accordingly, shaped, formed, or molded articles comprising the poly(ester-carbonate) are also provided. The poly(ester-carbonate)s can be molded into useful shaped articles by a variety of methods, such as injection molding, extrusion, rotational molding, blow molding, and thermoforming. End-use applications include molded articles such as instrument panels for cars; sheet materials; food service containers; housings for telephones; housings for computer; optical articles such as eyeglasses, lenses, and face shields; and recording media such as compact disks. The desired article can be obtained by molding a composition comprising the poly(ester-carbonate), for example by injection molding or compression molding; extrusion methods; or solution casting methods. Injection molding is a preferred method of forming the article.

Provided herein is a method of preparing a poly(ester-carbonate), in particular a high flow ductile poly(ester-carbonate). The method advantageously combines the use of a tubular reactor and a tank reactor to provide poly(ester-carbonate)s having good incorporation of a dicarboxylic acid. Furthermore, poly(ester-carbonate)s having superior melt flow, superior ductility, or both, compared to the corresponding homopolycarbonates can be prepared. Therefore, a substantial improvement in preparing poly(ester-carbonate)s is provided.

The methods and poly(ester-carbonate)s of the present disclosure will be illustrated further by means of the following non-limiting examples.

EXAMPLES

Comparative Example 1

A 10 wt % solution of sebacic acid (SBA) in aqueous sodium hydroxide (NaOH) was prepared by dissolution of 100 kilograms (kg) SBA powder in 33% aqueous NaOH (136 kg) to which deionized (DI) water (762 kg) was added. This solution was then fed to a batch polymerization stirred tank reactor to obtain a mole percent of incorporated SBA in the final poly(ester-carbonate) of 5.5-9.0%. Before beginning the polymerization reaction, a reactant mixture was formulated by combining 91 kg bisphenol A (BPA), 189 liters of water, 511 liters of dichloromethane, 0.9 kilograms of triethylamine, 0.23 kg of 15% aqueous solution of sodium gluconate and 10 kilograms of 33 wt % para-cumyl phenol (PCP) in dichloromethane. This mixture was charged to the reactor, and the SBA solution was added in the quantity required to achieve the desired mole percent SBA in the final polycarbonate. After addition of all reactants, phosgene was added to the reactor at the rate of 2.3 kg per minute. The pH in the reactor was maintained at 7.5-8.0 by addition of 33% aqueous NaOH until 40% of the total phosgene required by the batch recipe was added. The batch phosgene set point was calculated at 25-40% excess over the stoichiometric phosgene required for the batch BPA charge. The pH was then ramped up to 10.5 for rest of the batch while maintaining the phosgene addition rate. The phosgene addition rate was then dropped in three steps of 0.3 kg per minute (kg/min) each as polymerization progressed. The final 10% of the phosgene addition was carried out at 1.13 kg/min.

Six polymer batches produced by this reaction process yielded SBA-BPA copolymers with a weight average molecular weight of 24,292 Daltons (Da) containing 6.79-6.93 mole percent of SBA. The residual SBA in brine was an average of 5.7 ppm as measured by a UPLC coupled with an Evaporative Light Scattering Detector.

Another measure of quality of the copolymer is the drop in molecular weight when subjected to a diisobutylamine (DIBA) test, referred to as the "MW drop test." In the MW drop test, a polymer sample dissolved in a solvent suitable for gel permeation chromatography (GPC) was added to two small vials. Strong acid such as 1-2 N hydrochloric (HCl) acid is added to one vial in equal quantity to the polymer solution, and DIBA is added to the second vial. After standing both vials for about 5 minutes, the vial containing DIBA is quenched with HCl. Resin phases in each of the vials are separated, purified with DI water, and the molecular weight is measured on each resin phase by GPC. MW drop was calculated as the percentage reduction in MW of polymer in the vial with DIBA compared to MW of polymer in the vial with HCl. A molecular weight drop of less than 10% is considered acceptable. The molecular weight drop for the copolymer made using this technique was found to be 1.51% which was within the desirable limit.

The batch reaction process described in this example illustrates a successful method for preparation of a copolymer of SBA and BPA containing acceptably low residual SBA in reaction brine upon completion of the batch.

Comparative Examples 2-6

A series of poly(ester-carbonate)s including adipic acid at greater than 99% incorporation were prepared using the following procedure. A 75 liter reactor with mechanical agitation, condenser, caustic scrubber servicing the vent system and recirculation loop with turnover time <30 seconds was used. The reactor was charged with 4200 grams bisphenol-A, 300 grams adipic acid, 145 grams p-cumyl-phenol, 30 milliliters triethylamine, 10 grams sodium gluconate, 1 liter DI water and 27 liters dichloromethane. 1264 grams of phosgene was added to the reactor at 80 g/min rate while maintaining the reactor pH at 6.0 with 50 wt % solution of NaOH in water. At the low water loadings in step 1, to prevent NaCl precipitation, DI water was co-fed at 50 g/min with the phosgene. Upon completion of first step phosgenation, DI water of 9 liters was added and the pH rose to 9.5 by addition of 50 wt % aqueous NaOH. 1476 grams of phosgene was then added at 80 g/min rate while maintaining the pH at 9.5 with 50 wt % NaOH in water. The reactor was purged with nitrogen for 10 minutes to remove any unreacted phosgene from the reactor. A total of 4919 grams of 50 wt % NaOH solution was used. Polymer MW was 24,531 Da as determined by GPC (relative to polycarbonate standards). Residual adipic acid in the brine phase was 648 ppm as analyzed using UPLC coupled with an evaporative light scattering detector. This corresponds to adipic acid incorporation of 96.0%. Four additional formulations CE3-CE6 were prepared by the same procedure as above for CE2. The variables used are amount of catalyst and amount of phosgene added at the lower pH. Triethylamine was used as catalyst and P-cumylphenol (PCP) as polymer chain end-capping agent. Sodium gluconate addition helps remove trace metal impurities. The formulations and results are shown in Table 1 below.

TABLE 1

|  | Unit | CE2 | CE3 | CE4 | CE5 | CE6 |
| --- | --- | --- | --- | --- | --- | --- |
| Initial Formulation | | | | | | |
| Water | L | 1 | 1 | 1 | 1 | 1 |
| $CH_2Cl_2$ | L | 24 | 24 | 24 | 24 | 24 |
| Bisphenol-A | G | 4200 | 4200 | 4200 | 4200 | 4200 |
| triethylamine | mL | 30 | 25 | 125 | 25 | 125 |
| Adipic Acid | G | 300 | 300 | 300 | 300 | 300 |
| PCP | G | 145 | 145 | 145 | 145 | 145 |
| Na Gluconate | G | 10 | 10 | 10 | 10 | 10 |
| 1st Phosgenation | | | | | | |
| Initial pH | | 6 | 6 | 6 | 6 | 6 |
| total phosgene added | G | 1264 | 1000 | 1000 | 1500 | 1500 |
| Phosgenation rate | g/min | 80 | 80 | 80 | 80 | 80 |
| Co-feed water | g/min | 50 | 50 | 50 | 50 | 50 |

TABLE 1-continued

|  | Unit | CE2 | CE3 | CE4 | CE5 | CE6 |
|---|---|---|---|---|---|---|
| 2nd Formulation | | | | | | |
| Water | L | 9 | 9 | 9 | 9 | 9 |
| 2nd Phosgenation | | | | | | |
| pH | | 9.5 | 9.5 | 9.5 | 9.5 | 9.5 |
| total phosgene added | G | 1476 | 1750 | 1750 | 1250 | 1250 |
| Phosgenation rate | g/min | 80 | 80 | 80 | 80 | 80 |
| Total 50 wt % NaOH solution added | G | 4919 | 5189 | 4547 | 5219 | 5077 |
| Properties | | | | | | |
| Polymer MW | Da | 24531 | 24406 | 25024 | 24318 | 24524 |
| Adipic Acid in Brine | Ppm | 648 | 816 | 83 | 127 | 65 |
| Brine Phase | G | 18801 | 18774 | 18132 | 19116 | 18974 |
| Adipic Acid Incorporation | % | 96 | 94.9 | 99.5 | 99.2 | 99.6 |

As is shown by Comparative Examples 2-6 in Table 1, the initial phosgenation reaction is carried out at a pH of 6. Advantageously, the tubular process, for example as described below for Examples 1 and 2 below, can be carried out at a higher pH (e.g., 8-8.5).

Example 1

A 7 wt % sebacic acid (SBA) solution was prepared by dissolving 27 kg of dry SBA powder in 65 kg of 33 wt % aqueous sodium hydroxide (NaOH) solution, and 249 kg of deionized (DI) water. Phosgene at a rate of 1 kg/min was dissolved in dichloromethane at a rate of 5 kg/min, and fed to the jacketed tubular reactor where it contacted SBA solution fed at the rate of 5.9 kg/min at the reactor entrance. The tubular reactor has an internal diameter of 1 inch and includes 4 elements that give a combined length of 108 inches. The outer diameter of the jacket of the tubular reactor is 2 inches. Chilled water having an average temperature of 1 to 5° C. flows in the tube jacket at the rate of about 253 liters per minute. The formulation tank mixture consisted of 86 kg of bisphenol A (BPA), 151 liters water, 416 liters dichloromethane (including the rinse), and 0.22 kg of 15% aqueous solution of sodium gluconate. The formulation tank contents were discharged to the reactor and 0.7 kilograms of triethylamine (TEA) and about 10 kilograms of 33 wt % para-cumyl phenol (PCP) in dichloromethane were added to the reactor. The phosgene set point for the batch was 50 kg. The tube discharge to the reactor started at the same time as phosgene and was completed at 40% of phosgene set point. The pH set point for the first part of the reaction, i.e., during tube reactor discharge into main stirred tank reactor, was maintained at 8.3 and the pH varied from 8-8.5. After the tube discharge was complete, the pH was ramped up to 10.5 and it varied from 10-11 for the remainder of the batch.

This process yielded a copolymer having a weight average molecular weight of 24,887 Daltons (Da) containing SBA in the amount of 6.3 mol %. The residual SBA in brine was measured at 47 ppm upon batch completion. Another measure of quality of the copolymer is the drop in molecular weight when subjected to a diisobutylamine (DIBA) test, referred to as the "MW drop test." In the MW drop test, a polymer sample dissolved in a solvent suitable for gel permeation chromatography (GPC) was added to two small vials. Strong acid such as 1-2 N hydrochloric (HCl) acid is added to one vial in equal quantity to the resin solution, and DIBA is added to the second vial. After standing both vials for about 5 minutes, the vial containing DIBA is quenched with HCl. Resin phases in each of the vials are separated, purified with DI water, and the molecular weight is measured on each resin phase by GPC. MW drop was calculated as the percentage reduction in MW of polymer in the vial with DIBA compared to MW of polymer in the vial with HCl. A molecular weight drop of less than 10% is considered acceptable. The molecular weight drop for the copolymer made using this technique was found to be 1.96%. This example therefore describes a process involving a tube reactor that yields a copolymer of SBA and BPA such that residual SBA in brine upon completion of the batch is less than 50 ppm.

Example 2

A 7 wt % sebacic acid (SBA) solution was prepared by dissolving 27 kg of dry SBA powder in 65 kg of 33 wt. % aqueous sodium hydroxide (NaOH) solution, and 294 kg of deionized (DI) water. Phosgene at a rate of 1 kg/min was dissolved in dichloromethane at a rate of 9 kg/min, and fed to the jacketed tubular reactor where it contacted SBA solution fed at the rate of 5.9 kg/min at the reactor entrance. The tubular reactor has an internal diameter of 1 inch and includes 4 elements that give a combined length of 108 inches. The outer diameter of the jacket of the tubular reactor is 2 inches. Chilled water having an average temperature of 1 to 5° C. flows in the tube jacket at the rate of about 254 liters per minute. The formulation tank mixture consisted of 86 kg of bisphenol A (BPA), 151 liters water, 416 gallons dichloromethane (including the rinse), and 0.22 pounds of 15% aqueous solution of sodium gluconate. The formulation tank contents were discharged to the reactor and 0.7 kilograms of triethylamine (TEA) and about 10 kilograms of 33 wt % para-cumyl phenol (PCP) in dichloromethane were added to the reactor. The phosgene set point for the batch was 50 kg. The tube discharge to the reactor started at the same time as phosgene and was completed at 40% of phosgene set point. The pH set point for the first part of the reaction, i.e., during tube reactor discharge into main stirred tank reactor, was maintained at 8.5 and the pH varied from 8.2-8.8. After the tube discharge is complete, the pH was ramped up to 10.5 and it varied from 10-11.5 for the remainder of the batch.

This process yielded a copolymer having a weight average molecular weight of 24,174 Daltons (Da) containing SBA in the amount of 6.95 mole percent (mol %). The residual SBA in brine was measured at 115 ppm upon batch completion. Another measure of quality of the copolymer is the drop in molecular weight when subjected to a diisobutylamine (DIBA) test, referred to as the "MW drop test" which is described in example 1 above. The molecular weight drop for the copolymer made under the conditions described above was measured to be 6.88%. This example therefore describes a process involving a tube reactor that yields a copolymer of SBA and BPA such that residual SBA in brine upon completion of the batch is less than 125 ppm.

Comparative Examples 7-13

Comparative examples 7-13 utilize a tube reactor and do not result in good incorporation of SBA in a copolymer as desired (i.e., <50 ppm in brine). The key variables are the ratio of phosgene to SBA ("Phos:SBA"; mol:mol ratio), residence time in tubular reactor (seconds), volume fraction of organic to total volume in the tubular reactor and pH set point in the main stirred tank reactor during tube discharge. All other variables were kept the same as described in Example 1 above. The results are summarized in Table 2.

TABLE 2

| Reaction variable | CE7 | CE8 | CE9 | CE10 | CE11 | CE12 | CE13 |
|---|---|---|---|---|---|---|---|
| Phos:SBA | 6 | 6 | 4 | 6.5 | 6 | 3 | 4 |
| Residence time | 35.4 | 35.4 | 28.5 | 39.2 | 35.4 | 30.5 | 20.2 |
| Organic vol. fraction (%) | 61 | 61 | 62 | 56 | 61 | 51 | 66 |
| pH Set point | 9 | 10 | 10 | 8.8 | 9.75 | 8.5 | 8.5 |
| Results |  |  |  |  |  |  |  |
| MW | 23,324 | 22,971 | 23,929 | 23,919 | 22,948 | 23,169 | 23,312 |
| MW drop (%) | 7.26 | 9.47 | 8.30 | 8.59 | 3.63 | 4.19 | 4.87 |
| SBA (mol %) | 6.59 | 6.17 | 5.64 | 6.75 | 5.66 | 6.5 | 7.43 |
| Residual SBA in brine (ppm) | 584 | 1749 | 4045 | 346 | 1601 | 422 | 437 |

As demonstrated by the results in Tables 1 and 2, a specific combination of reaction parameters yields high quality SBA-BPA copolycarbonates.

The methods and poly(ester-carbonate)s described herein are further illustrated by the following embodiments, which are non-limiting.

Embodiment 1

A method of preparing a poly(ester-carbonate), the method comprising contacting an aqueous solution comprising a dicarboxylic acid with a first solution comprising phosgene and a first organic solvent in a tubular reactor to provide a first reaction mixture comprising the dicarboxylic acid, the corresponding diacid chloride, phosgene, or a combination comprising at least one of the foregoing; combining a dihydroxy aromatic compound, the corresponding dialkali metal salt of the dihydroxy aromatic compound, or a combination comprising at least one of the foregoing, water, and a second organic solvent to provide a second reaction mixture; introducing the first reaction mixture, the second reaction mixture, and a second solution comprising phosgene to a tank reactor, wherein the tank reactor has a first pH of 7 to 9, preferably 8 to 9, more preferably 8 to 8.5, to provide a third reaction mixture comprising the poly(ester-carbonate).

Embodiment 2

A method of preparing a poly(ester-carbonate), the method comprising contacting an aqueous solution comprising a dicarboxylic acid with a first solution comprising phosgene and a first organic solvent in a tubular reactor to provide a first reaction mixture comprising the dicarboxylic acid, the corresponding diacid chloride, phosgene, or a combination comprising at least one of the foregoing; combining a dihydroxy aromatic compound, the corresponding dialkali metal salt of the dihydroxy aromatic compound, or a combination comprising at least one of the foregoing, water, and a second organic solvent to provide a second reaction mixture; introducing the first reaction mixture, the second reaction mixture, and a second solution comprising phosgene to a tank reactor, wherein the tank reactor has a first pH of 7 to 9, preferably 8 to 9, more preferably 8 to 8.5; and subsequently raising the pH to 9 to 11, preferably 10 to 11 to provide a third reaction mixture comprising the poly(ester-carbonate).

Embodiment 3

The method of embodiment 1 or 2, wherein the tubular reactor comprises a tube jacket outside tubular reactor, the jacket comprising water at a temperature of 1 to 10° C. flowing through the jacket to maintain a reaction mixture temperature of 20 to 55° C. within the tubular reactor.

Embodiment 4

The method of any one or more of embodiments 1 to 3, wherein the first reaction mixture has a residence time in the tubular reactor of 15 to 50 seconds.

Embodiment 5

The method of any one or more of embodiments 1 to 4 wherein the contacting comprises introducing the first solution comprising phosgene and a first organic solvent to the tubular reactor at a linear fluid velocity of 3 to 45 meters per minute.

Embodiment 6

The method of any one or more of embodiments 1 to 5, wherein the contacting comprises introducing the aqueous solution to the tubular reactor at a rate that provides a combined linear velocity of all fluids in the tubular reactor of 5 to 65 meters per minute, preferably 8 to 60 meters per minute, more preferably 10 to 53 meters per minute.

Embodiment 7

The method of any one or more of embodiments 1 to 6, wherein the aqueous solution comprises an alkaline aqueous solution comprising 20 to 40 wt. % of an alkali metal hydroxide, preferably sodium hydroxide.

Embodiment 8

The method of any one or more of embodiments 1 to 7, wherein the aqueous solution further comprises a catalyst comprising a tertiary amine, preferably triethylamine Embodiment 9

The method of any one or more of embodiments 1 to 8, wherein the second reaction mixture further comprises a phase transfer catalyst, preferably wherein the phase transfer catalyst comprises a tetra($C_{1-6}$)alkyl ammonium halide or hexa($C_{1-6}$)alkylene diammonium dihalide, preferably methyltributyl ammonium halide, hexabutylbutylene diammmonium dihalide, or a combination comprising at least one of the foregoing.

Embodiment 10

The method of any one or more of embodiments 1 to 9, wherein the second reaction mixture further comprises a chelant, preferably sodium gluconate.

Embodiment 11

The method of any one or more of embodiments 1 to 10, wherein the second solution is introduced to the tank reactor at a rate effective to provide, average over one hour, a weight ratio of the phosgene to the aromatic dihydroxy compound of 0.3 to 3.1, preferably 0.9 to 2.2, more preferably 1.25 to 1.9.

Embodiment 12

The method of any one or more of embodiments 1 to 11, wherein the third reaction mixture comprises less than or equal to 125 ppm, preferably less than or equal to 75 ppm, more preferably less than or equal to 25 ppm, even more preferably less than or equal to 10 ppm of residual dicarboxylic acid.

Embodiment 13

The method of any one or more of embodiments 1 to 12, wherein the dicarboxylic acid comprises a $C_{6-36}$ aliphatic diacid, preferably sebacic acid, dodecanedioc acid, adipic acid, or a combination comprising at least one of the foregoing, more preferably sebacic acid.

Embodiment 14

The method of any one or more of embodiments 1 to 13, wherein the dihydroxy aromatic compound is of the formula

HO—Z—OH wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing.

Embodiment 15

The method of embodiment 14, wherein Z is a divalent group of the formula

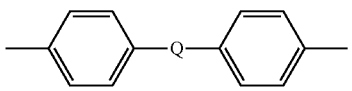

wherein Q is —O—, —S—, —C(O)—, —SO$_2$—, —SO—, or —C$_y$H$_{2y}$— wherein y is an integer from 1 to 5 or a halogenated derivative thereof, preferably wherein Z is 2,2-(4-phenylene)isopropylidene, more preferably wherein the dihydroxy aromatic compound is bisphenol A of the formula

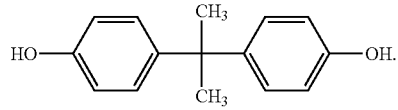

Embodiment 16

The method of any one or more of embodiments 1 to 15, further comprising adding an end-capping agent to the tank reactor, preferably wherein the end-capping agent comprises para-cumyl phenol.

Embodiment 17

The method of any one or more of embodiments 1 to 16, wherein the organic solvent comprises a $C_{1-6}$ chlorinated hydrocarbon, preferably dichloromethane.

Embodiment 18

The method of any one or more of embodiments 1 to 17, wherein the tank reactor is a stirred tank reactor.

Embodiment 19

A poly(ester-carbonate) prepared by the method of any one or more of embodiments 1 to 18.

Embodiment 20

The poly(ester-carbonate) of embodiment 19, wherein the poly(ester-carbonate) has a molecular weight drop of less than 10%, preferably less than 5%, more preferably less than 2%.

Embodiment 21

The poly(ester-carbonate) of embodiment 19 or 20, wherein the poly(ester-carbonate) is substantially free of dicarboxylic acid-dicarboxylic acid linkages, preferably wherein the poly(ester-carbonate) comprises less than 1 mole percent of dicarboxylic acid-dicarboxylic acid linkages.

Embodiment 22

An article formed from the poly(ester-carbonate) of any one or more of embodiments 19 to 21.

In general, the methods and poly(ester-carbonate)s can alternatively comprise, consist of, or consist essentially of, any appropriate components or steps herein disclosed. The methods and poly(ester-carbonates) can additionally, or alternatively, be formulated so as to be devoid, or substantially free, of any components, materials, ingredients, adjuvants, species, or steps used in the prior art methods or that are otherwise not necessary to the achievement of the function and/or objectives of the present claims.

All ranges disclosed herein are inclusive of the endpoints, and the endpoints are independently combinable with each other. "Or" means "and/or." "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. Reference throughout the specification to "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, 0, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—CH$_2$—) or propylene (—(CH$_2$)$_3$—)). "Alkenyl" and "alkenylene" mean a monovalent or divalent, respectively, straight or branched chain hydrocarbon group having at least one carbon-carbon double bond (e.g., ethenyl (—HC=CH$_2$) or propenylene (—HC(CH$_3$)=CH$_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group. "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P.

"Substituted" means that the compound or group is substituted with at least one (e.g., 1, 2, 3, or 4) substituents instead of hydrogen, where each substituent is independently nitro (—NO$_2$), cyano (—CN), hydroxy (—OH), halogen, thiol (—SH), thiocyano (—SCN), C$_{1-6}$ alkyl, C$_{2-6}$ alkenyl, C$_{2-6}$ alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl, C$_{7-13}$ arylalkylene (e.g, benzyl), C$_{7-12}$ alkylarylene (e.g, toluyl), C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the group, including those of the substituents. All references are incorporated herein by reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of preparing a poly(ester-carbonate), the method comprising contacting an aqueous solution comprising a dicarboxylic acid with a first solution comprising phosgene and a first organic solvent in a tubular reactor to provide a first reaction mixture comprising the dicarboxylic acid, the corresponding diacid chloride, phosgene, or a combination comprising at least one of the foregoing;

combining a dihydroxy aromatic compound, the corresponding dialkali metal salt of the dihydroxy aromatic compound, or a combination comprising at least one of the foregoing, water, and a second organic solvent to provide a second reaction mixture;

introducing the first reaction mixture, the second reaction mixture, and a second solution comprising phosgene to a tank reactor, wherein the tank reactor has a first pH of 7 to 9; and subsequently raising the pH to 9 to 11 to provide a third reaction mixture comprising the poly(ester-carbonate).

2. A method of preparing a poly(ester-carbonate), the method comprising contacting an aqueous solution comprising a dicarboxylic acid with a first solution comprising phosgene and a first organic solvent in a tubular reactor to provide a first reaction mixture comprising the dicarboxylic acid, the corresponding diacid chloride, phosgene, or a combination comprising at least one of the foregoing;

combining a dihydroxy aromatic compound, the corresponding dialkali metal salt of the dihydroxy aromatic compound, or a combination comprising at least one of the foregoing, water, and a second organic solvent to provide a second reaction mixture;

introducing the first reaction mixture, the second reaction mixture, and a second solution comprising phosgene to a tank reactor, wherein the tank reactor has a first pH of 7 to 9, to provide a third reaction mixture comprising the poly(ester-carbonate).

3. The method of claim 1, wherein the tubular reactor comprises a tube jacket arranged outside the tubular reactor, the jacket comprising water at a temperature of 1 to 10° C. flowing through the jacket to maintain a reaction mixture temperature of 20 to 55° C. within the tubular reactor.

4. The method of claim 1, wherein the first reaction mixture has a residence time in the tubular reactor of 15 to 50 seconds.

5. The method of claim 1 wherein the contacting comprises introducing the first solution comprising phosgene and a first organic solvent to the tubular reactor at a linear fluid velocity of 3 to 45 meters per minute.

6. The method of claim 1, wherein the contacting comprises introducing the aqueous solution to the tubular reactor at a rate that provides a combined linear velocity of all fluids in the tubular reactor of 5 to 65 meters per minute.

7. The method of claim 1, wherein the aqueous solution comprises an alkaline aqueous solution comprising 20 to 40 wt. % of an alkali metal hydroxide.

8. The method of claim 1, wherein the aqueous solution further comprises a catalyst comprising a tertiary amine.

9. The method of claim 1, wherein the second reaction mixture further comprises a phase transfer catalyst; and a chelant.

10. The method of claim 1, wherein the second solution comprising phosgene is introduced to the tank reactor at a rate effective to provide a weight ratio of the phosgene to the aromatic dihydroxy compound, averaged over one hour, of 0.3 to 3.1.

11. The method of claim 1, wherein the third reaction mixture comprises less than or equal to 125 ppm of residual dicarboxylic acid.

12. The method of claim 1, wherein
the dicarboxylic acid comprises a $C_{6-36}$ aliphatic diacid; and
the dihydroxy aromatic compound is of the formula

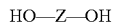

wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing.

13. The method of claim 1 further comprising adding an end-capping agent to the tank reactor.

14. The method of claim 1, wherein the organic solvent comprises a $C_{1-6}$ chlorinated hydrocarbon.

15. The method of claim 1, wherein the tank reactor is a stirred tank reactor.

16. A poly(ester-carbonate) prepared by the method of claim 1, wherein the poly(ester-carbonate) has a molecular weight drop of less than 10 and wherein the poly(ester-carbonate) comprises less than or equal to 125 ppm of residual dicarboxylic acid.

17. The poly(ester-carbonate) of claim 16, wherein the poly(ester-carbonate) is substantially free of dicarboxylic acid-dicarboxylic acid linkages.

18. An article formed from the poly(ester-carbonate) of claim 16.

* * * * *